(12) United States Patent
Wegmann et al.

(10) Patent No.: US 12,025,101 B2
(45) Date of Patent: Jul. 2, 2024

(54) METHOD FOR DETECTING DIFFERENT VIBRATIONS OF A WIND TURBINE

(71) Applicant: Wobben Properties GmbH, Aurich (DE)

(72) Inventors: Harald Wegmann, Neuschoo (DE); Wolfgang De Boer, Moormerland (DE)

(73) Assignee: Wobben Properties GmbH, Aurich (DE)

( * ) Notice: Subject to any disclaimer, the term of this patent is extended or adjusted under 35 U.S.C. 154(b) by 233 days.

(21) Appl. No.: 17/413,826

(22) PCT Filed: Dec. 16, 2019

(86) PCT No.: PCT/EP2019/085331
§ 371 (c)(1),
(2) Date: Jun. 14, 2021

(87) PCT Pub. No.: WO2020/127034
PCT Pub. Date: Jun. 25, 2020

(65) Prior Publication Data
US 2022/0025862 A1    Jan. 27, 2022

(30) Foreign Application Priority Data
Dec. 17, 2018   (DE) ..................... 10 2018 132 413.8

(51) Int. Cl.
*F03D 7/02*      (2006.01)
*F03D 13/20*     (2016.01)
*F03D 17/00*     (2016.01)

(52) U.S. Cl.
CPC ........... *F03D 7/0296* (2013.01); *F03D 13/20* (2016.05); *F03D 17/00* (2016.05);
(Continued)

(58) Field of Classification Search
CPC ........ F03D 7/0296; F03D 13/20; F03D 17/00; F03D 7/00; F03D 7/02; F05B 2220/706;
(Continued)

(56) References Cited

U.S. PATENT DOCUMENTS

| 4,410,806 A | 10/1983 | Brulle |
| 4,420,692 A | 12/1983 | Kos et al. |

(Continued)

FOREIGN PATENT DOCUMENTS

| CN | 102042166 A | 5/2011 |
| CN | 102486158 A | 6/2012 |

(Continued)

OTHER PUBLICATIONS

Ekelund, Thommy, "Dynamics and Control of Structural Loads of Wind Turbines," *Proceedings of the American Control Conference*, Philadelphia, Pennsylvania, Jun. 1998, pp. 1720-1724.

(Continued)

*Primary Examiner* — Brandon D Lee
(74) *Attorney, Agent, or Firm* — Seed IP Law Group LLP

(57) ABSTRACT

A method for operating a wind turbine, and the wind turbine comprises a generator for generating electrical power from wind, the generator having a generator axis, a nacelle for supporting the generator, and a tower for supporting the nacelle, the tower having a tower axis, and the method comprises the steps sensing at least one tower vibration by means of a vibration sensor, sensing a mechanical generator vibration, caused by at least one electrical fault, by means of the same vibration sensor, and controlling the wind turbine in dependence on the sensed tower vibration and the sensed generator vibration.

16 Claims, 4 Drawing Sheets

(52) U.S. Cl.
CPC . *F05B 2220/706* (2013.01); *F05B 2220/7066* (2013.01); *F05B 2270/334* (2013.01)

(58) Field of Classification Search
CPC ....... F05B 2270/334; F05B 2220/7066; Y02E 10/72; Y02E 10/728
See application file for complete search history.

(56) References Cited

U.S. PATENT DOCUMENTS

| | | | |
|---|---|---|---|
| 5,978,972 | A | 11/1999 | Stewart et al. |
| 6,876,099 | B2 | 4/2005 | Wobben |
| 10,465,661 | B2 | 11/2019 | Franke et al. |
| 2006/0066111 | A1* | 3/2006 | Suryanarayanan ..... F03D 7/042 290/44 |
| 2007/0110578 | A1 | 5/2007 | Stommel |
| 2007/0176428 | A1* | 8/2007 | Nagao ................... F03D 7/042 290/44 |
| 2014/0042746 | A1 | 2/2014 | Wong et al. |
| 2014/0122011 | A1 | 5/2014 | Cao et al. |
| 2017/0306926 | A1 | 10/2017 | Deshpande et al. |
| 2017/0363072 | A1 | 12/2017 | Son et al. |

FOREIGN PATENT DOCUMENTS

| | | |
|---|---|---|
| CN | 104781548 A | 7/2015 |
| CN | 105934581 A | 9/2016 |
| DE | 3308566 C2 | 11/1987 |
| DE | 202008006322 U1 | 7/2008 |
| DE | 102007011835 A1 | 10/2008 |
| DE | 102008023109 A1 | 3/2009 |
| DE | 102016203013 A1 | 8/2017 |
| EP | 0223729 B1 | 11/1990 |
| EP | 0490805 A1 | 6/1992 |
| WO | 83/01490 A1 | 4/1983 |
| WO | 99/36695 A1 | 7/1999 |
| WO | 01/77524 A1 | 10/2001 |
| WO | 2009033472 A2 | 3/2009 |

OTHER PUBLICATIONS

Larwood, Scott M., "Dynamic Characterization of the AWT-26 Turbine for Variable Speed Operation," *National Renewable Energy Laboratory*: 19 pages, Jul. 1998.

Furnée et al., "Motion Analysis by Non-Contacting Camera/Computer Measurement System—A New Tool for Dynamic Field Testing of Wind Turbines," *DEWI Magazin Nr. 16*:60-65, Feb. 2000.

Thiringer et al., "Periodic Pulsations from a Three-Bladed Wind Turbine," *IEEE Transactions On Energy Conversion*. 16(2):128-133, Jun. 2001.

* cited by examiner

METHOD FOR DETECTING DIFFERENT VIBRATIONS OF A WIND TURBINE

BACKGROUND

Technical Field

The present invention relates to a method for sensing a plurality of vibrations of a wind turbine. The invention also relates to a method for operating a wind turbine, in which a plurality of vibrations are sensed. The present invention additionally relates to a wind turbine.

Description of the Related Art

Wind turbines that generate electrical power from wind are well known. During the operation of such a wind turbine, however, disturbances can occur, which are monitored to protect the wind turbine. One possible disturbance is excessive vibration of the tower, namely in the region of the tower head, and thus in the region of the nacelle of the wind turbine that is mounted on the tower head. Such a vibration can be caused by wind excitation at a corresponding resonant frequency, and can attain such high amplitudes that the wind turbine has to be at least partially shut down to protect it. Such a tower vibration, resulting in the shutdown of a wind turbine, can also be triggered by an earthquake, for example. Depending on the amplitude of the vibration, the operation of the wind turbine may then likewise be stopped, or at least interrupted. As soon as this strong vibration has passed, the wind turbine can be restarted, if necessary also fully automatically.

To sense such tower vibrations, an acceleration sensor may be mounted on top of the nacelle of the wind turbine. It senses accelerations that enable the tower movement to be calculated. This is described, for example, in the patent specification U.S. Pat. No. 6,876,099.

Another possible disturbance can be a mechanical vibration of the generator. Particularly in the case of gearless wind turbines, the electrodynamic rotor of the generator rotates just as fast as the aerodynamic rotor, namely for instance in the range of from 5 to 20 (rpm) revolutions per minute. If unbalances occur here, for example, this can also pose a risk to the wind turbine. And here likewise, depending on such a sensed vibration, a protective measure may be initiated, which in the most extreme case can mean stopping the wind turbine.

On a modern, and therefore complex, wind turbine there are thus many potential sources of disturbance, the monitoring of which can require a great deal of sensor technology. It should be noted that nowadays such a wind turbine is already equipped with a very large number of sensors in order to be able to sense as many eventualities as possible. Such sensors, however, can increase both the acquisition costs and the maintenance costs of such a wind turbine. Nevertheless, it is generally advisable to use high-quality sensors in order, in turn, to avoid sensor failure and also to ensure that the measured values are as reliable as possible. However, such requirements in turn result in an increase in costs rather than a cost reduction.

The German Patent and Trade Mark Office has searched the following prior art in the priority application for the present application: DE 10 2007 011 835 A1, DE 10 2016 203 013 A1, U.S. Pat. No. 6,876,099 B2, US Pat. Pub. No. 2014/0122011 A1, US Pat. Pub. No. 2017/0306926 A1, and US Pat. Pub. No. 2017/0363072 A1.

BRIEF SUMMARY

Provided are techniques in which mechanical vibrations can be monitored as reliably as possible while keeping costs as low as possible. At least, an alternative solution to previously known solutions is to be proposed.

A method for sensing a plurality of vibrations of a wind turbine is proposed. Thus, the method is for sensing mechanical vibrations of a wind turbine and is based on a wind turbine having a generator for generating electrical power from wind, the generator having a generator axis, and a nacelle for supporting the generator. A tower is also provided for supporting the nacelle. For such a wind turbine, it is proposed that a tower vibration is sensed by means of a vibration sensor, and a mechanical generator vibration, caused by electrical faults, is sensed by means of the same vibration sensor.

A mechanical generator vibration triggered by an electrical fault is one in which, for example, a partial short circuit or other electrical fault causes an irregularity in the electric field. As a result, the generator no longer runs smoothly, which can also be referred to as irregular running. Such irregular running due to an electrical fault is different from irregular running due to an unbalance. An unbalance results in a periodic load with a frequency corresponding to the rotor rotational speed, whereas a mechanical generator vibration triggered by electrical faults can result in a load with a higher frequency. A mechanical generator vibration triggered by electrical faults can also result in a rather jerky motion, whereas an unbalance results in a substantially sinusoidal load curve, or in a sinusoidal oscillatory motion.

In particular, it was recognized in this case that a tower vibration and a mechanical generator vibration triggered by electrical faults, which for simplicity is referred to in the following as generator vibration, have such similarity in respect of expected frequencies and amplitudes that both the tower vibration and the generator vibration can be sensed by the same sensor. At the same time, however, it was also recognized that tower vibrations and mechanical generator vibrations are nevertheless so different that they can be distinguished despite being sensed by one and the same vibration sensor.

In this way, different mechanical vibrations can be sensed with one and the same, in particular an established vibration sensor. Thus, costs can be saved by avoiding a second sensor, while at the same time the remaining one vibration sensor can be of a high quality. Thus, despite saving of the sensor, reliable vibration sensing can be achieved for both the tower vibration and the generator vibration.

In particular, it is proposed that the operation of the wind turbine takes into account the sensed tower vibration and the sensed mechanical generator vibration. In particular, it is proposed that the wind turbine is controlled in dependence on the sensed tower vibration and the sensed generator vibration. In particular, a generator rotational speed can be adjusted in dependence both on the sensed tower vibration and on the sensed generator vibration.

In particular, it was also recognized in this case that the tower vibration can be related to the mechanical generator vibration. For example, the mechanical generator vibration triggered by at least one electrical fault can excite a tower vibration, even if this only has, for example, half the frequency of the generator vibration. Through the joint sensing by means of the same vibration sensor, systematic measurement errors, especially measurement delays, can thus be avoided or become irrelevant, or at least lose their significance, if they are equally present for both sensed vibrations. Especially when both vibrations are compared, such systematic errors can cancel each other out.

This can be particularly important when comparing phase positions. This is because, if phase positions are recorded for both vibrations, the phase shift between these two vibrations can be distorted by different sensors. If the same sensor is used, this problem does not exist. Such a phase shift can also exist between, on the one hand, the fundamental component and one vibration type and, on the other hand, a harmonic component of another vibration type.

An important consideration of the sensed tower vibration and the sensed mechanical generator vibration for operating a wind turbine is to alter the operating point of the wind turbine, if necessary, in the event of a disturbance that can be identified by these vibrations, in particular to alter or reduce its rotational speed, i.e., the rotational speed of the aerodynamic rotor. A reduction of the rotational speed to zero can also be considered in this case.

According to one embodiment, it is proposed that the vibration sensor is realized as an acceleration sensor. The concept in this case is based, in particular, on the fact that a wear-free or low-wear sensor can be used, because measurement of the acceleration can suffice for sensing a mechanical vibration. In particular, it was also recognized that not only a tower movement can be sensed via an acceleration sensor, but also a generator vibration.

In particular, the use of a strain gauge, the measurement accuracy of which also depends on the quality of the fastening, can be avoided. In particular, it has also been recognized that both the tower vibration and the mechanical generator vibration can be sensed by use of an acceleration sensor. In order to achieve this result of joint vibration sensing by means of a strain gauge or strain sensor, such a sensor would have to be placed at a position where both the generator vibration and the tower vibration result in strain. It was recognized, however, that such a measurement position is difficult to find. A tower vibration could be sensed well by means of a strain gauge at a position at the tower base, whereas a generator vibration may possibly be sensed by measuring a strain of an element that would be located between the stator and the rotor-bearing axle journal. It was recognized, however, that such a solution would be complicated and that an acceleration sensor is suitable for the joint sensing of tower vibration and mechanical generator vibration.

In particular, it is proposed that the acceleration sensor senses an acceleration in at least two directions, ideally in two mutually orthogonal directions. In this way, basically any direction of vibration, being thus composed of these two mutually orthogonal sensed vibrations, can be identified in a continuous manner.

In connection with this it was also recognized that an acceleration sensor can detect both directions of vibration at one and the same point and thus sense the resulting, or underlying, common direction of vibration. It was also recognized that this is also possible individually for each of the two vibration types, namely for both the tower vibration and the mechanical generator vibration. If the respective vibration is extracted from the signal in each sensed direction, i.e., the tower vibration on the one hand and the generator vibration on the other hand, a separate direction of vibration can be sensed, respectively, for both the tower vibration and the generator vibration. In addition, all subsequent explanations of a generator vibration also relate to in principle a mechanical generator vibration.

According to one embodiment, it is proposed that the vibration sensor is arranged on the generator, in particular on a stator of the generator. Usually, such a generator has only one stator and this vibration sensor can be arranged on the stator. It then detects mechanical vibrations of the generator, as it is directly connected to the generator. At the same time, it also detects tower vibrations because the entire nacelle, and thus also the generator, vibrates with the tower. The position of the vibration sensor on the stator of the generator is therefore not only favorable for sensing the mechanical generator vibration, but also for sensing the tower vibration.

It was recognized in this case that it is not necessary to attach the sensor to the tower for the purpose of sensing the tower vibration, and that it is not even necessary for the sensor, if attached to the nacelle, to be arranged centrally in relation to the tower, i.e., to be arranged substantially in alignment with the longitudinal axis of the tower, i.e., above the tower axis. Rather, it was recognized that especially the position in the region of the generator that, at least in the case of modern gearless wind turbines extends far beyond a tower-head region, can sense tower vibrations very well, especially in the pitch direction of the nacelle, or generator, because the tower vibration can be perceived even more distinctly at this position, or can be amplified by a nacelle movement. However, detection of vibrations transverse to the pitch direction is not significantly worse at this position than at a position centrally above the tower, which was thus recognized here.

It is additionally or alternatively proposed that the vibration sensor is arranged on a stator carrier that supports the stator of the generator. Such a stator carrier is also located in the immediate vicinity of the generator and can transmit generator vibrations well. Such a stator carrier can be so rigid and close to the stator that it can also be considered as part of the stator. In this case, the vibration sensor would be located on the stator and at the same time on the stator carrier. Thus, the same beneficial effects apply to this position as explained above for the position on the generator stator.

The same also applies to a proposed position of the vibration sensor in a front part of the nacelle and/or in a region in front of the tower axis. According to one embodiment, it is proposed to place the vibration sensor in a front part of the nacelle, and thus the vibration sensor can be placed close to the generator or even on the generator. An arrangement on the stator of the generator and/or on the supporting stator carrier is in the front part of the nacelle in the case of a gearless wind turbine, which is preferably proposed here. A region toward the aerodynamic rotor is referred to as the front part of the nacelle. It is assumed in this case that the wind turbine is realized as a so-called upwind rotor. For the same case of a downwind rotor, an arrangement in a rear part of the nacelle would be assumed. The region in front of the tower axis is therefore also a region in the front part of the nacelle, and arranging the sensor there accordingly has the same advantages as explained for the arrangement in the front part of the nacelle.

According to one embodiment, it is proposed that a longitudinal vibration signal and a transverse vibration signal are sensed. The longitudinal vibration signal in this case is directed in a longitudinal direction of the generator axis and the transverse vibration signal is directed in a direction transverse to the longitudinal direction. In particular, both directions of vibration are sensed in a horizontal plane. This is because in this case it was recognized that a tower vibration, in particular a vibration of the tower head, occurs substantially in a horizontal plane. This direction of vibration can then oscillate in a direction in this horizontal plane, thus, for example, from north to south or from north-east to south-west, to name just two illustrative examples. Of course, this direction of vibration can also change.

On the one hand, the generator can execute a vibration in the sense of an eccentricity, which thus results in a vibration, or a plurality of vibrations, transverse to the axis of rotation. Thus, as part of this, a vertical direction of vibration can also occur in the case of the generator. In connection with this, however, it was recognized that such a quasi-eccentric vibration, i.e., a vibration transverse to the axis of rotation of the generator, also has a horizontal component, but still transverse to the axis of rotation. In particular, it was recognized that such a direction of vibration, namely transverse to the axis of rotation, is dominant or is to be expected predominantly. This can be easily detected by the detection of a vibration in a horizontal direction, namely transverse to the axis of rotation.

In addition, the generator can in particular also have a vibration in the manner of a tilt direction, which, however, especially in the region of the air gap of the generator, is detected substantially as a vibration in the longitudinal direction of the axis of rotation of the generator. This is therefore then also a direction in a horizontal plane, and in this case transverse to the previously described direction of vibration, which is also in the horizontal plane but transverse to the longitudinal axis.

It was therefore recognized that the detecting of two directions of vibration in a horizontal plane is suitable for both the tower vibration and the generator vibration. Thus, although the tower vibration already by nature differs in its direction from the vibration, or possible vibrations, of the generator, it was recognized that these two by nature different vibrations can be sensed by means of the same vibration sensor. It is proposed herein making use of this, including for the observation and sensing of the directions of vibration.

Nevertheless, it may of course be provided, in particular for the generator, also to sense a vertical component. The preferred embodiment, which senses two directions of vibration in a horizontal plane, however, does not require the sensing of such a vertical third component.

According to one embodiment, it is proposed that at least one vibration signal detected by the vibration sensor is separated, in dependence on frequency, into a tower-vibration signal and a generator-vibration signal, wherein, in particular, a filter means is used, and frequency components lying below a predefinable separation frequency are used as a tower-vibration signal and frequency components lying above the separation frequency are used as a generator-vibration signal. It was recognized in particular in this case that, by means of a simple frequency division, a jointly detected vibration signal can be divided into signal components of the tower vibration and of the generator vibration. One detected vibration signal in this case may be a longitudinal vibration signal and another detected vibration signal may be a transverse vibration signal. These signals may then be processed further, namely depending on whether they are assigned, respectively, to the tower vibration or to the generator vibration. The filter means may have a high-pass filter and a low-pass filter, and may be implemented as a digital filter means in a process computer.

For the generator vibration, it is proposed that this is sensed in a frequency range of from 2 to 20 Hertz (Hz). It is therefore particularly advantageous to use a separation frequency in the range of between 1.25 and 2 Hz. For example, a separation frequency of 1.5 Hz may be used.

Preferably, the separation frequency is specified in dependence on a current rotor rotational speed, and thus generator rotational speed. It was recognized in particular in this case that, for the purpose of separation between tower vibration and generator vibration, this frequency may be dependent on the rotational speed of the rotor, or generator. In particular, the frequency of the generator vibration may depend on the rotor rotational speed, and the frequency of the tower vibration may depend in particular on a natural frequency of the tower, and less on the rotor rotational speed. In the case of a higher rotor rotational speed, there is then a greater frequency difference between the two vibration types, which may also make it useful to alter the separation frequency.

According to one embodiment, it is proposed that a tower longitudinal vibration and a tower transverse vibration are sensed as at least one tower vibration. A tower longitudinal vibration is a vibration of the tower that is directed in the longitudinal direction of the generator axis. A tower transverse vibration is a vibration of the tower in a direction transverse to the generator axis, but which also vibrates in a horizontal plane and is directed transversely in relation to the tower axis.

A tower longitudinal vibration, which may also be referred to as a tower pitch vibration, is triggered in particular by the wind, namely in particular by the wind acting upon an aerodynamic rotor of the wind turbine. For simplicity, in the following the aerodynamic rotor is also referred to as the rotor.

The tower transverse vibration can be caused, in particular, by an unbalance of the rotor.

All three vibrations, i.e., the mechanical generator vibration triggered by at least one electrical fault, the tower longitudinal vibration and the tower transverse vibration, are detected by means of the same vibration sensor. It was recognized that all three vibrations can nevertheless be distinguished. This is possible because the tower vibrations can be distinguished from the mechanical generator vibration by their different frequencies, and the two tower vibrations can be distinguished from each other by their directions.

According to one embodiment, it is proposed that the controlling of the wind turbine is functionally divided into a working-point control and a protective control. In particular, in this case it is proposed that the two control domains are strictly separated from each other.

The working-point control is designed to control the wind turbine at a working point. In dependence on the wind speed, in particular, it controls the wind turbine with a rotational speed appropriate to this wind speed and a power output appropriate to this wind speed. To this extent, this working-point control constitutes a normal control. If the wind changes, this is sensed and the working point can change accordingly if, for example, the wind speed drops in partial load operation and the operating point changes to an operating point with a lower rotational speed than before and a lower power output than before.

The protective control is hierarchically of a higher order than this working-point control and is designed to check the protective functions of the wind turbine. The hierarchical higher order means that the working-point control is subordinate to the protective control. Thus, if the protective control provides for a different rotational speed than the working-point control, in particular if the protective control provides for a reduction of the rotational speed to zero, the working-point control must subordinate itself to this and the rotational speed that the working-point control would suggest is not set. In particular, the rotational speed specified by the working-point control up to that point is abandoned.

In particular, it is provided that the protective control checks for disturbance criteria and, if a predetermined disturbance criterion is identified, takes over the working-point control and, in dependence on the disturbance criterion that is sensed, moves to a safe working point. Such a safe working point may mean, in particular, that a rotation of the rotor of the wind turbine is reduced to zero. However, it may also mean that the wind turbine continues to be operated at a lower rotational speed. Incidentally, rotational speed here basically means the rotor speed of the aerodynamic rotor, which however corresponds to the rotational speed of the generator, insofar as a gearless wind turbine is taken as a basis.

Thus, the protective control can also use one and the same vibration sensor for tower vibration monitoring and generator vibration monitoring, or evaluate information or signals from one and the same vibration sensor. A distinction is nevertheless made in this case between tower vibration and generator vibration, and different limit values are used as a basis. It was recognized, however, that the use of one and the same vibration sensor is nevertheless possible, so that there is only a small resource requirement in respect of the provision of the vibration sensor.

According to one design, it is proposed that the protective control is realized as a fail-safe control. In particular, it is proposed in this case that the working-point control is not designed as a fail-safe control. This is based on the idea that a complex fail-safe control is only to be provided for the protective control. The wind turbine can thus be partially controlled and managed, via the working-point control, using complex open-loop and closed-loop control processes, without the need to guarantee fail-safe operation with a similar resource requirement for this purpose.

Nevertheless, essential safety functions can be made fail-safe by concentrating the fail-safety, and thus the corresponding and in part costly measures, on the protective control, or even limiting them to the protective control. In particular, such fail-safety can be achieved via redundancy, and this redundancy only needs to be provided for the protective control. To this extent, operation can be realized with a high safety standard at, nevertheless, a reasonable cost.

Additionally or alternatively, it is provided that the protective control has a main and a secondary control, wherein the main control executes the protective control, and the secondary control takes over the protective control or a part thereof if the main control fails completely or partially. In this way, the aforementioned fail-safe control can be achieved.

A variant in this case is that the main control and the secondary control are executed simultaneously. Thus, if the protective control takes over upon identification of a fault criterion, it executes the main control and the secondary control at the same time so that they both execute setting of the safe working point. This can mean, for example, that both initiate the shutdown of the wind turbine, in that both trigger, for example, a pre-programmed or otherwise prepared emergency pitching of the rotor blades.

In particular, it is preferably proposed that the main control and the secondary control may be similar or even identical or at least almost identical, in order thereby to achieve redundancy. However, redundancy may also preferably be achieved by two different systems being able to achieve the same or similar things.

For example, it is proposed that, in the event of a disturbance, when the rotational speed needs to be reduced to zero, this is performed by the protective control, using its main control. Such a reduction of the rotational speed to zero includes turning the rotor blades to a feathered position. To do this, the main control may move the rotor blades, over a pre-programmed blade-angle/time variation, into their feathered position. If even the main control of the protective control fails, the secondary control can bring the rotor blades into feathered position instead, but possibly in a simpler way, for example, by providing the respective pitching motors with a constant input voltage or a constant input current, in order thereby to generate a substantially constant pitching torque to turn the rotor blades to the feathered position until they reach a mechanical limit switch.

This is to be understood as an illustrative example of various actions to be taken in the event of a disturbance, i.e., when a fault has been sensed. This achieves fail-safety because it is based on the idea that it is not likely that the main and secondary control will fail at the same time, especially if the secondary control is also simpler and therefore less susceptible to faults.

Preferably, none of this is intended for the working-point control. This is because, for the working-point control, it can then be sufficient to assume that it works without disturbance. The working-point control does not need to be prepared for disturbances. If significant disturbances occur, the protective control, which is hierarchically of a higher order than the working-point control, can take over. In the event of such a disturbance, which is basically a rare occurrence, the control permission and capability is temporarily withdrawn from the working-point control, and the protective control takes over until the identified disturbance has been eliminated and the wind turbine can, and is allowed to, operate normally again.

According to one embodiment, it is proposed that a disturbance is identified, in particular that the protective control identifies a disturbance, if the sensed tower vibration exceeds a predetermined tower-vibration limit value, in particular if a, or the, tower longitudinal vibration exceeds a predetermined tower longitudinal-vibration limit value, and/or a, or the, tower transverse vibration exceeds a predetermined tower transverse-vibration limit value.

The protective control, or another unit, may also identify a disturbance if the sensed generator vibration exceeds a predetermined generator-vibration limit value. In particular, it is proposed here to use the tower vibration amplitude of the respective tower vibration as the sensed tower vibration, and/or to consider an acceleration in each case, so that the respective vibration limit value represents a limit value of an acceleration. It is also proposed to use the generator vibration amplitude for the consideration of the generator vibration. Here, too, the acceleration of the generator vibration may be considered. In particular, it is provided that the tower-vibration limit value, the tower longitudinal-vibration limit value and the tower transverse-vibration limit value are each different from the generator-vibration limit value. In particular, the tower-vibration limit value, the tower longitudinal-vibration limit value and the tower transverse-vibration limit value are each greater than the generator-vibration limit value, in particular the tower-vibration limit value, the tower longitudinal-vibration limit value and the tower transverse-vibration limit value are each at least five times as great as the generator-vibration limit value.

According to one design, it is proposed that, for the tower longitudinal vibration, the tower transverse vibration and/or the generator vibration, a vibration characteristic is monitored in each case, and for the vibration characteristic it is checked in each case whether it departs from a first vibration tolerance band, and each departure from the first vibration tolerance band is summed or integrated to form an exceedance sum, and if the exceedance sum attains or exceeds a predetermined maximum sum in a predetermined first check period, the wind turbine is stopped due to a disturbance, or a vibration warning is output and a stopping of the wind turbine depends on the further variation of the vibration characteristic, wherein in particular, in a first subsequent step, the exceedance sum is set to zero and, in a second subsequent step, each departure from the first vibration tolerance band is again summed or integrated to form the exceedance sum until a vibration warning is again output, wherein then the first and second subsequent steps are repeated, the vibration warnings that occur during this are counted, and it is checked whether, in a predetermined second check period that is longer than the first check period, the number of vibration warnings has attained a predetermined warning number limit and, depending on this, the wind turbine is stopped due to a disturbance or continues to be operated.

Thus, the monitoring of a first vibration tolerance band is proposed. The vibration tolerance band thus has a positive and a negative limit, which the vibration should not exceed or fall below. If the limit is nevertheless exceeded or under-run, i.e., if there is a departure from the tolerance band, the method commences further observation and evaluation of this exceedance or under-running.

The positive and negative limits preferably have the same value in respect of amount, in particular namely the generator-vibration limit value or the tower-vibration limit value, or the tower longitudinal-vibration limit value or the tower transverse-vibration limit value. Of course, a plurality of these vibration types may be monitored at the same time, in particular all three vibration types at the same time, and then the corresponding limit, and thus the corresponding limit value, is used in each case.

Preferably, for the generator-vibration limit value and the tower-vibration limit value, or for the tower longitudinal-vibration limit value and the tower transverse-vibration limit value, respectively, a first and a second limit value may be specified, wherein the first limit value may correspond respectively to the limit of the first vibration tolerance band, and the second limit value may correspond respectively to the limit of a second vibration tolerance band, which is described below.

Each departure from the first vibration tolerance band, i.e., every exceedance or under-running of the respective limit, is sensed and integrated or added up. In integration, basically the area between an exceedance or under-running vibration curve and the respective limit is integrated and compared with a predetermined maximum sum. It was recognized that, instead of integrating such areas, it may usually be sufficient to detect only a tolerance band departure number, or a number of times the tolerance band is exceeded or under-run, i.e., to count only the departure. In both cases, the result is compared with a predetermined maximum sum, the value of which is of course also predetermined depending on whether integration or counting is effected. If this maximum sum is attained or exceeded, the presence of a disturbance is assumed, i.e., a disturbance is identified.

For the further evaluation, however, two variants are proposed. According to one variant, upon identification of a disturbance the wind turbine is stopped, which may be accompanied by the output of a corresponding fault signal.

According to another variant, upon identification of the disturbance only a vibration warning, i.e., a warning signal, is issued at first. In this case, the wind turbine can continue to operate for the time being. However, the vibration behavior continues to be monitored.

For the further monitoring, it is suggested in particular that it is monitored whether such a disturbance occurs again, and in particular how often or frequently it occurs. For this purpose, the integrating or adding-up, i.e., counting, can be reset such that it starts again from the beginning. This can be effected by resetting the exceedance total to zero. Then, as described above, integrating, or counting, can be used to check for a new disturbance.

If further disturbances are identified in this way, it is checked how often this happens. For this purpose, a second check period is defined that is longer than the first check period. The first check period may have a duration, for example, in the range of from 5 hours to 2 days, in particular the duration of one day, while the second check period may have a duration of from 3 to 14 days, in particular a duration of 7 days.

If too many disturbances are identified within the second check period, i.e., if the number of vibration warnings exceeds the predetermined warning number limit in the second check period, the wind turbine is stopped due to a disturbance. The predetermined warning number limit may be in a range of from 3 to 10, in particular about 5 or 6.

However, if this warning number limit is not attained in the second check period, this count of identified disturbances may also be reset, i.e., either reduced to zero, or reduced by one counter in predetermined reduction intervals, which may be, for example, one day. This also allows the counter to be reduced to zero if, for example, it had risen to four, but then no more disturbances were sensed for four days. The values are not reduced beyond zero into the negative.

Checking of whether the number of vibration warnings has attained a predetermined warning number limit in the predetermined second check period may also be achieved through selection of the warning number limit and selection of the duration of the reduction interval. For example, if the warning number limit is 4 and the duration of the reduction interval is one day, stopping will be effected if there were 4 disturbances identified in one day, 5 disturbances identified in two days, 6 disturbances identified in three days, or 7 disturbances identified in four days. A maximum permissible number of 7 faults in four days may thus be achieved by presetting the warning number limit to 4 and the duration of the reduction interval to one day. In this case, a disturbance would also be identified if one or few disturbances were identified in a shorter period of time, but this is an advantageous effect.

Preferably, a disturbance is identified and the wind turbine is stopped if the vibration characteristic departs once from a second vibration tolerance band, which is broader than the first tolerance band. This second vibration tolerance band thus has broader limits than the first vibration tolerance band. If there is only one departure from it, the disturbance is so severe that the wind turbine is stopped immediately for its own protection, in any case without further checking of the vibration.

In this way, an at least two-stage monitoring can be achieved, which in the case of large vibrations, but which do not yet directly endanger the wind turbine, initially only starts monitoring and monitors the further course of the vibrations, but which immediately results in stopping of the wind turbine in the case of even larger vibrations, which can endanger the wind turbine.

The described monitoring of the vibration characteristic can be performed in a mutually independent manner for each described vibration type, with preferably differing values being specified for the check criteria.

According to an embodiment, it is proposed that the two-stage checking for a disturbance is performed only for the tower vibration, whereas a one-stage check is provided for the generator vibration.

Preferably, an acceleration characteristic is monitored as the vibration characteristic in each case. For the generator vibration, an acceleration characteristic, and thus an acceleration that should not exceed a value of 2 g, may preferably also be taken into account. Accordingly, a limit value may be set at 2 g, or preferably in the range of from 1 to 2 g.

Preferably, tower vibrations are sensed, in the longitudinal and the transverse direction, in the frequency range of from 0.1 to 1.25 Hz. For this purpose, according to one embodiment it is proposed that a separation frequency is set to a value above 1.25 Hz. In particular, a value of 1.25 to 2 Hz is proposed as a separation frequency.

It is proposed that, preferably, from the vibration under investigation, the maximum occurring acceleration is sensed in each case. This may preferably be effected in the longitudinal and transverse directions. For the tower vibration, it is proposed, for both the longitudinal and the transverse direction, to set as a limit value a value that corresponds to twice the acceleration due to gravity, i.e., corresponding to two g. Preferably, a lower value in the range of from 1 to 2 g is specified as the maximum amount of acceleration, in which case, when this limit value is attained, stopping of the wind turbine is effected, in particular an emergency pitching of the rotor blades to the feathered position.

A wind turbine is also proposed. Such a wind turbine comprises a generator having a generator axis for generating electrical power from wind, wherein the generator can be driven by an aerodynamic rotor having one or more rotor blades, a nacelle for operating the generator, a tower for supporting the nacelle, a vibration sensor for sensing a tower vibration, wherein the vibration sensor is also configured for sensing a mechanical generator vibration, and a control means for controlling the wind turbine in dependence on the sensed tower vibration and in dependence on the sensed generator vibration.

Thus, a wind turbine is proposed that is the basis for the method described above, the above method, according to at least one embodiment described, being implemented on the wind turbine. In particular, the control is implemented in the control means. The control means may be realized, in particular, as a process computer, or implemented in a process computer of the wind turbine.

According to one embodiment, it is proposed that the wind turbine is realized as a gearless wind turbine. The aerodynamic rotor thus directly drives the generator, namely its electrodynamic rotor, which is also referred to as the rotor. This results in the generator, which is preferably realized as a synchronous generator, being a slowly rotating generator, in particular a multipolar generator. In this context, a multi-pole generator is understood to mean, in particular, one that has at least 96 stator poles. Such a generator of a gearless wind turbine thus also results in a potential vibration spectrum that has higher frequencies than that of an expected tower vibration, but the spectrum, i.e., the frequency range, in which vibrations are to be expected, is significantly closer to that of expected tower vibrations.

In particular, it is assumed that such a generator has a nominal rotational speed of below 20 rpm. It therefore differs significantly from a generator of a geared wind turbine, the rotational speed of which can regularly be in the range of from 1500 to 3000 rpm. Moreover, the generator of a gearless wind turbine is usually arranged in a region in front of the tower of the wind turbine, at least in relation to the upper tower region. Thus, a vibration sensor that is arranged in the region of the generator is also arranged in such a region.

Preferably, the vibration sensor is realized as an acceleration sensor, and in particular is configured to sense an acceleration in at least two directions, in particular in two directions substantially orthogonal to each other in a horizontal plane. This has the advantages already explained above in connection with corresponding embodiments of the method.

According to a further design, it is proposed that the vibration sensor is arranged on the generator, in particular on a stator of the generator, on a generator carrier that carries the generator and/or in a front part of the nacelle. For further explanations, reference is also made to the explanations already given above concerning corresponding embodiments of the corresponding method.

BRIEF DESCRIPTION OF THE SEVERAL VIEWS OF THE DRAWINGS

The invention is explained exemplarily in greater detail in the following on the basis of embodiments, with reference to the accompanying figures.

DETAILED DESCRIPTION

Figure 1:
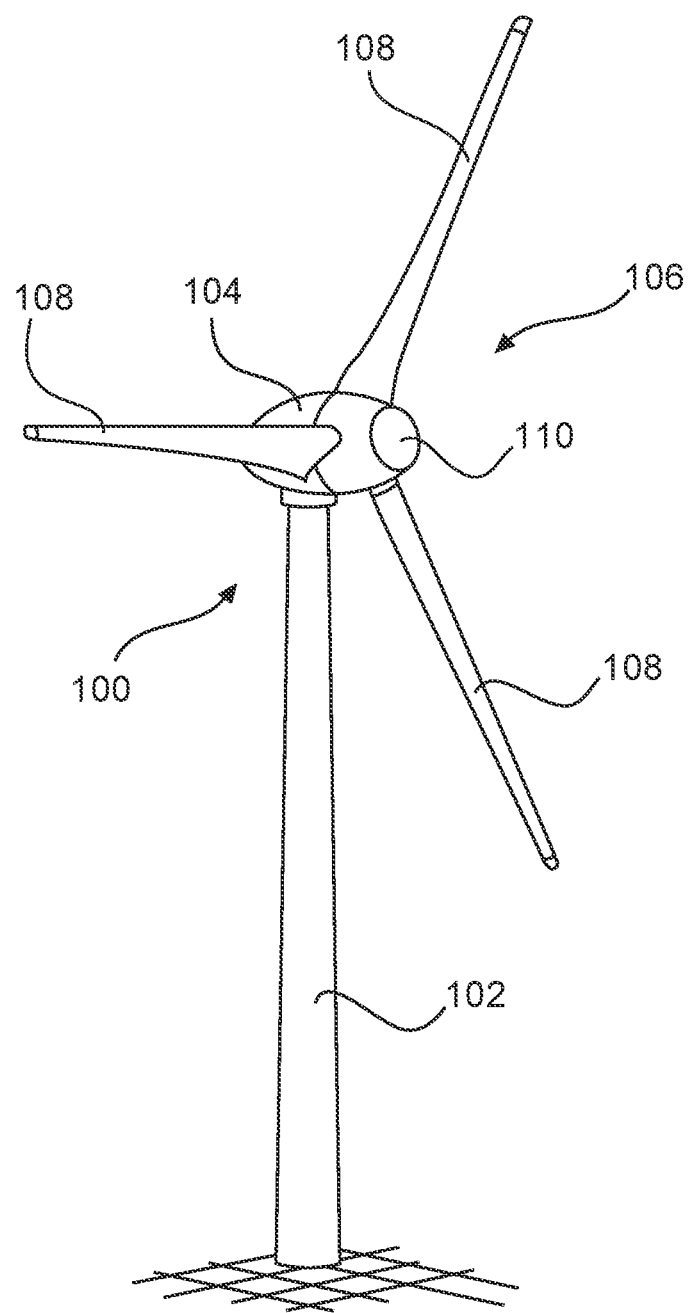
FIG. 1 shows a wind turbine in a perspective representation.

FIG. 1 shows a wind turbine 100, having a tower 102 and a nacelle 104. Arranged on the nacelle 104 there is a rotor 106, which has three rotor blades 108 and a spinner 110. During operation, the wind causes the rotor 106 to rotate, thereby driving a generator in the nacelle 104.

Figure 2B:
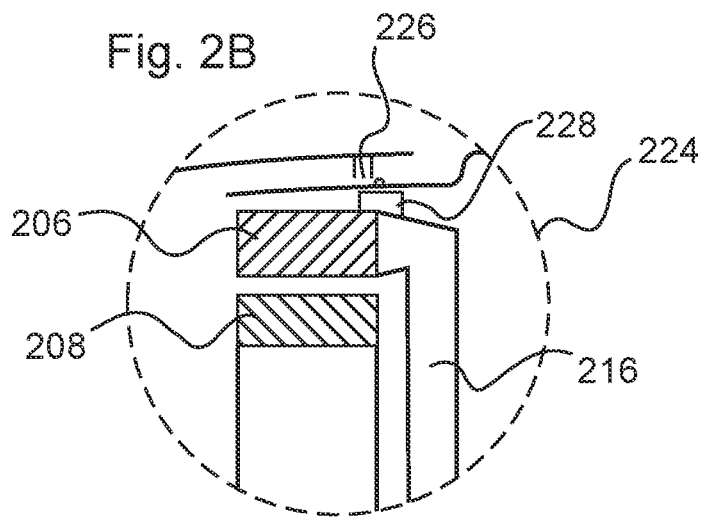
FIG. 2B shows a close up of a portion of the wind turbine of FIG. 2A.
Figure 2A:
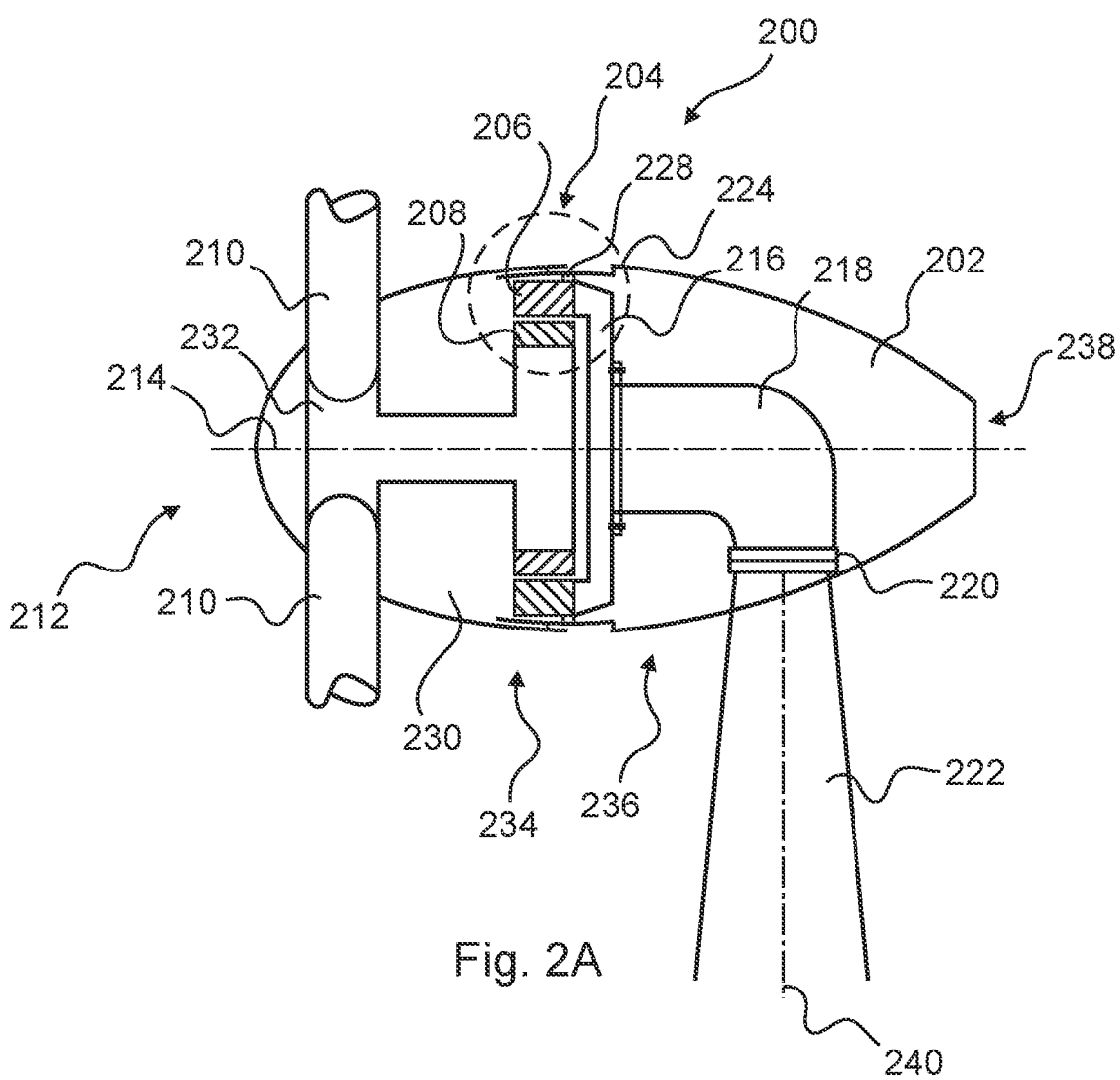
FIG. 2A shows, in schematic form, a side view of a part of a wind turbine.

FIG. 2A shows a schematic detail of a wind turbine 200, with a nacelle 202 and a generator 204. The generator 204 has a stator 206 and a rotor 208. The rotor 208 is directly coupled to three rotor blades 210, which are represented only partially and only in schematic form, and of which only two are represented, because in the position represented the third rotor blade is on the opposite side of the nacelle 202.

The generator 204 is thus realized as an internal rotor and, since this rotor 208 is directly connected to the rotor blades 210 and thus to the aerodynamic rotor 212, this a gearless wind turbine. During operation, the rotor 208 rotates relative to the stator 206, about a generator axis 214. The generator axis 214 is thus also simultaneously the axis of rotation of the rotor 212. For reasons of simplicity, any bearings are not represented in FIG. 2A.

The stator 206 is attached to a main carrier 218 via a stator carrier 216. The main carrier 218 is rotatably mounted on the tower 222 via a yaw bearing 220.

FIG. 2B also shows an enlarged detail 224. In addition to a circumferential brush seal 226, a vibration sensor 228 is shown, which may be realized as an acceleration sensor. This vibration sensor 228 is arranged on and attached to the stator 206, and thus to the generator 204. The vibration sensor 228 is also at the same time arranged on the stator carrier 216.

It can also be seen from the general view in FIG. 2A that the vibration sensor 228 is arranged in a front part of the nacelle 202. It should be noted that in this FIG. 2A the rotating part, namely the so-called spinner 230, is drawn significantly longer than usual. Usually, the distance between the rotor blades 210, or the hub 232 to which they are attached, and the rotor 208 is much shorter. The front part 234 may be referred to as the nacelle part that adjoins the main carrier 218 and in which the generator 204, including stator carrier 216, is arranged. On the other hand, the rear part 236 of the nacelle extends approximately from the connection region between main carrier 218 and the stator carrier 216, rearward to the ventilation outlet 238.

In FIG. 2A it can be seen, in particular, that the generator 204 extends far beyond the tower 222. The vibration sensor 228 also extends far beyond this tower 222. In particular, it is not arranged on the tower 222 and also not in the region above the tower 220, in particular there also not in the region of an extension of the tower axis 240.

The vibration sensor 228 is configured to detect two directions of vibration, namely, on the one hand, in the longitudinal direction of the generator axis 214 and, on the other hand, in a direction transverse to it, namely into the plane of the drawing as shown in FIG. 2A. Thus, two informative directions of vibration can be sensed, for both a tower vibration of the tower 222 and for a generator vibration of the generator 204. A possible evaluation, together with further processing, is illustrated in FIG. 3.

Figure 3:
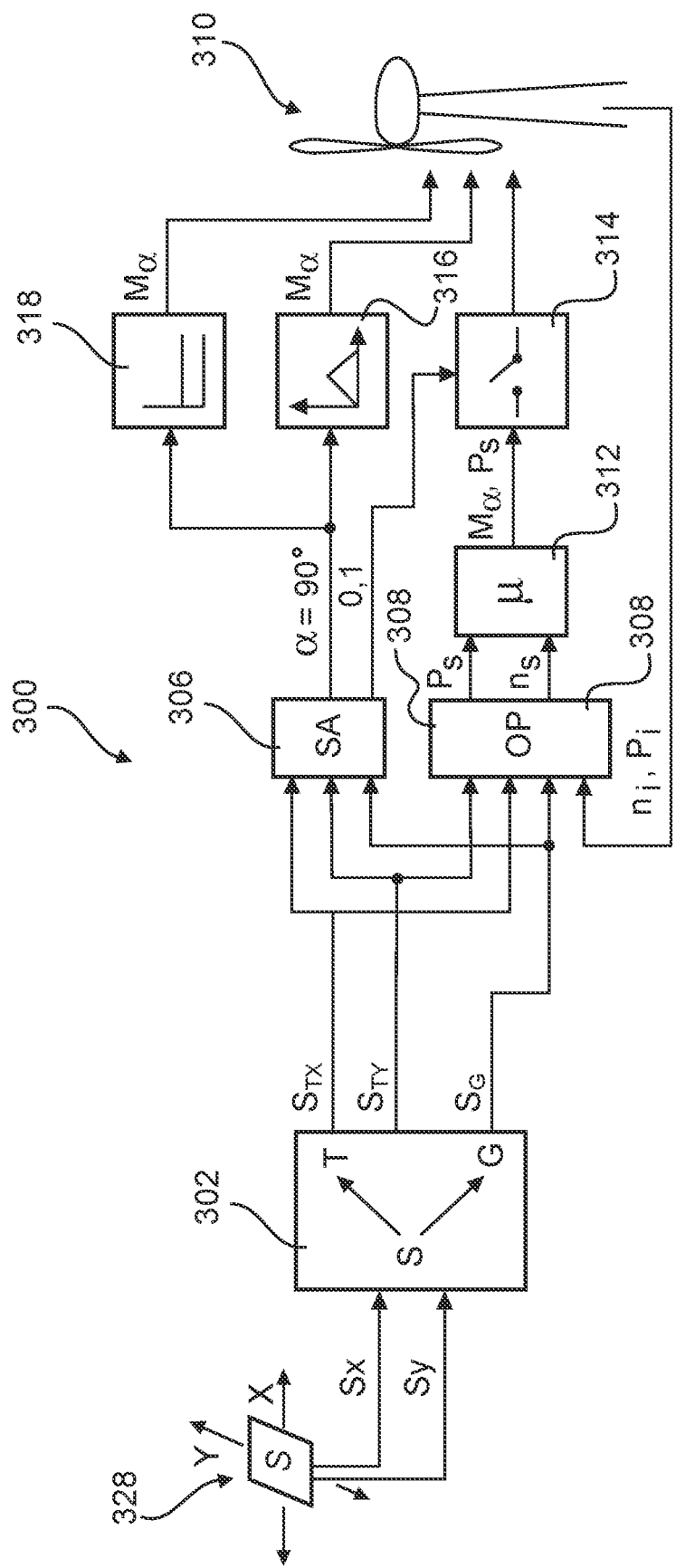
FIG. 3 shows, in schematic form, a measurement and control structure for operating a wind turbine, taking account of a vibration measurement.

Thus, a measurement and control structure 300 is shown schematically in FIG. 3. This measurement and control structure 300 begins, on the left-hand side represented there, with the schematic representation of a vibration sensor 328, which may correspond to the vibration sensor 228 of FIG. 2A. This vibration sensor 328, which is preferably realized as an acceleration sensor, can sense two mutually orthogonal directions of vibration, denoted here as X and Y. Preferably and/or in the case of a preferred vibration sensor 228 according to FIG. 2A, these two directions X and Y lie in a horizontal plane. The X-direction may denote a direction of vibration in the direction of the longitudinal axis of the generator, and the Y-direction a direction transverse thereto.

Accordingly, this vibration sensor 328 outputs two measurement signals, namely one for each of the two directions X and Y. These two vibration signals may be referred to as a longitudinal-vibration signal $S_X$ and transverse-vibration signal $S_Y$. These two signals are then given to a separation block 302, in which there may be an integrated separation circuit, or in which a signal separation, described below, is performed by a corresponding microprocessor, or a corresponding evaluation program. Thus, both signals, i.e., the longitudinal-vibration signal $S_X$ and the transverse-vibration signal $S_Y$, are separated, respectively, into a tower-vibration signal and a generator-vibration signal. For this purpose, it is symbolically represented in the separation block 302 that a total signal S is separated into a tower signal T and a generator signal G.

The separation block 302 then outputs, as a result, three individual signals, namely, a tower longitudinal-vibration signal $S_{TX}$, a tower transverse-vibration signal $S_{TY}$, and a generator-vibration signal $S_G$.

As a next step, this exemplary measurement and control structure 300 proposes to take into account, in a protective control that is included in the protective function block 306, these three signals, namely here the tower longitudinal-vibration signal $S_{TX}$, the tower transverse-vibration signal $S_{TY}$, and the generator-vibration signal $S_G$.

At the same time, an operation control block 308 is also provided, which includes a working-point control and also receives all information about the vibration, namely the three signals, i.e., the tower longitudinal-vibration signal Six, the tower transverse-vibration signal $S_{TY}$, and the generator-vibration signal $S_G$.

A working point, specified by the working-point control of the operation control block 308 in order to control the wind turbine at this working point, may thus be adapted, altered or set depending on vibration information, or it may also be determined that an alteration of the working point is not necessary. To this extent, the operation control block 308, or the working-point control therein, performs a control of the wind turbine, namely at least to the extent that it outputs a setpoint power $P_S$ and a setpoint rotational speed $n_S$.

These two variables may substantially define the working point of the wind turbine, which may also be referred to as the operating point. This may be effected, in particular, in dependence on a sensed rotational speed $n_i$ and a sensed power $P_i$.

The sensed power $P_i$, and then correspondingly also the setpoint power PS, denotes in particular an output power of the wind turbine, which is represented schematically as the wind turbine 310. The representation of the wind turbine 310 in FIG. 3 is also to be understood as being purely schematic, in that the measurement and control structure 300 shown may in principle be completely contained in the wind turbine 310.

In any case, this operating point is entered into the main control means 312 by specification of the setpoint rotational speed $n_S$ and the setpoint power $P_S$. The main control means 312 is also to be understood to this extent as being merely schematic, because in a main control means of a wind turbine basically everything can be performed that is explained in the measurement and control structure 300. In any case, the main control means 312 can then, in particular, generate correcting variables that are used to adjust the wind turbine 312, or its components.

To this extent also represented only illustratively, the main control means 312 of the measurement and control structure 300 of FIG. 3 outputs a torque for respectively one pitch motor, and a setpoint power $P_S$. The torque for the pitch motor is denoted here as Ma. It is specified by the main control means 312, and may relate to various other aspects that are not elaborated here, such as, for example, a consideration of the load on the respective pitch drives, and a consideration of a required adjustment speed, to name just two examples.

The setpoint power $P_S$ is also given for illustrative purposes only and may be implemented, for example, in such a manner that, in the case of an externally excited synchronous generator, a corresponding excitation current is set for this external excitation. In addition or alternatively, the setting of the setpoint power $P_S$ may be achieved or influenced by controlling the stator currents.

In any case, these two values shown by way of example, namely the drive torque $M_\alpha$ of a pitch motor in each case, and the intended output power $P_S$, are given to the wind turbine 310. By this it is meant that these values are given to the corresponding actuating means. According to the aforementioned examples, these would be the respective pitch motor, the respective excitation controller and/or a controllable rectifier connected downstream of the stator.

The wind turbine 310 is normally operated in this manner, i.e., via the working-point control in the operating control block 308 and the further implementation in the main control means 312. If a disturbance occurs, however, a protective control, as contained in the protective-control function block 306, can become active. Such a protective control function in this case monitors the vibrations, namely the tower longitudinal-vibration signal Six, the tower transverse-vibration signal $S_{TY}$, and the generator-vibration signal $S_G$.

If one of these signals exceeds a corresponding limit value, the protective control is activated and this initially results in the normal control being overridden. This is illustrated by the deactivation block 314. This is because, in this case, the protective control block 306 can trigger the deactivation block 413 and deactivate the normal control according to the operation control block 308 and the main control means 312. This is indicated by the symbolically represented open switch in the deactivation block 314.

At the same time, the protective control of the protective function block 306 performs its own control of the wind turbine 310 in order to bring it to a safe working point. In the simplest case, which is also illustrated here, the wind turbine is stopped for this purpose, i.e., thus brought as rapidly as possible to zero rotational speed. In the illustrative example, it is also necessary for this purpose to turn the blade angle to the feathered position, which in FIG. 3 is shown illustratively as 90 degrees. Usually, the feathered position is not exactly 90 degrees, but is close to it, such the value of α=90 degrees is illustratively a reasonable value. Other controls may of course be performed, such as also reducing the output power. For reasons of clarity, however, this is not elaborated here.

In any case, the protective control of the protective function block 306 causes the rotor blades to be moved into the feathered position, and for this purpose, via the main block 316, causes a torque to be generated for each pitch motor. For this purpose, the main block 316 may generate, or specify, for the respective pitch motor a torque that, for example, initially increases and then decreases over time. This is illustrated accordingly in the main block 316.

Preferably, however, this protective control is also realized as a fail-safe control and for this purpose may have a main control and a secondary control. The main block 316 may be regarded as the main control by way of illustration, or it may be representative of other main control functions that the protective control may have to perform. If this main control, or the main block 316 shown as representative of it, cannot perform the desired control, i.e., the desired generation of the torque for the pitch motor, a secondary block 318 is available as an illustrative element for a secondary control, which then takes over the activity that the main control can no longer perform due to the failure.

The secondary control, and thus illustratively the auxiliary block 318, may in this case be configured to execute in a more simple manner the control that is to be performed. This is illustrated here by the fact that the secondary block 318 also generates, or specifies, a torque $M_\alpha$ in order to control a pitch motor, but that this torque specification is effected less explicitly. By way of illustration, for this purpose the auxiliary block 318 has a symbolic diagram to indicate here that the torque $M_\alpha$ is simply set to a fixed value. The respective rotor blade can then rotate into its feathered position and this control, i.e., the generation or specification of the torque for the pitch motor, ends when the rotor blade has attained its feathered position and thereby actuates a limit switch. This limit switch then has the effect that no further torque is applied to the respective pitch motor.

The main control and the secondary control, illustrated here by the main block 316 and the secondary block 318 respectively, may also, however, be of the same design and work simultaneously and in parallel in that, for example, both issue a torque request to the pitch motors or a pitch motor control in the event of a disturbance, or only issue a switch-off signal that the pitch control can execute independently because, for example, this is pre-programmed accordingly.

Figure 4:
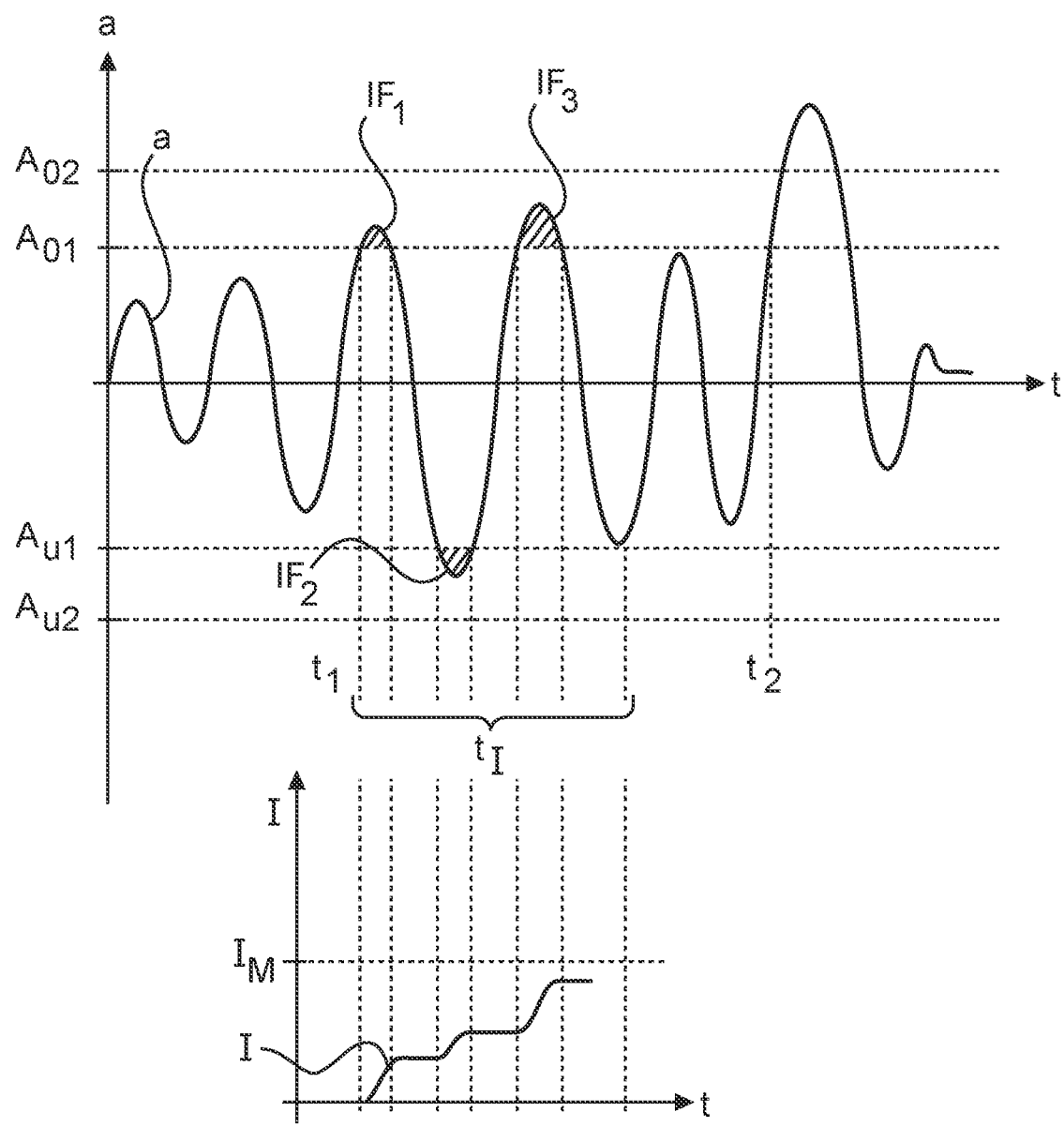
FIG. 4 shows, in schematic form, a possible vibration characteristic to illustrate possible trigger criteria for identifying a disturbance.

FIG. 4 shows a schematic characteristic of a vibration a over time. This illustratively represented vibration a may in each case represent a time-related characteristic of an acceleration, and may be illustrative for a tower vibration as well as illustrative for a generator vibration. In particular, they may relate to the tower longitudinal-vibration signal $S_{TX}$, the tower transverse-vibration signal $S_{TY}$, and the generator-vibration signal $S_G$ and for this purpose show, for example, the respective acceleration. These three vibrations may differ in many characteristics, but in the diagram of FIG. 4 two possible criteria in particular are to be explained, which can result in the identification of a disturbance. These criteria are proposed in the same way for the three vibration types.

It should also be noted, not only for this illustrative FIG. 4, but in general, that the vibration under consideration may be a tower vibration, both transverse and longitudinal, or a generator vibration. In particular in this case, the value of the respective criterion, or criteria, in particular the limit values, may be adapted accordingly.

FIG. 4 now shows the vibration characteristic a, which initially shows a vibration having a small amplitude, which then increases. At the time-point $t_1$ this vibration attains a first upper vibration limit value $A_{o1}$. This is indicated by a horizontal dashed line, and there is also a first lower vibration limit value $A_{u1}$, which preferably corresponds to the negative value of the first upper vibration limit value $A_{o1}$. It is thus preferably the case that $A_{u1}=-A_{o1}$. These two first vibration limit values may thus form a first vibration tolerance band. They may each form a first generator-vibration limit value or a first tower-vibration limit value, or a first tower longitudinal-vibration limit value or a first tower transverse-vibration limit value.

At this time-point $t_1$, when the vibration exceeds the first upper limit value, i.e., departs from the first vibration tolerance band, a disturbance is not yet identified, but the exceeding of this limit value is integrated, as is the underrunning of the first lower vibration limit value, which is a further departure from the first vibration tolerance band. This is illustrated in FIG. 4 as the hatched integral area $IF_1$. Such an integration is then continued over a predetermined integration period $t_1$, which can also be referred to synonymously as the first check period. Within this integration period $t_1$, the vibration continues and then falls below the first lower vibration limit value $A_{u1}$, thus again departing from the first vibration tolerance band. Upon this under-run, there is then likewise a value to be integrated, which is illustrated as the second integration area $IF_2$. This is also added to the integrated value of the first integration area $IF_1$. The vibration then continues and, in the example shown, again exceeds the first upper vibration limit value, such that the integration is continued, namely with the content of the third integration area $IF_3$.

This integration is also illustrated in a partial diagram in FIG. 4, which shows the characteristic of the exceedance integral value I, which may also be referred to synonymously as the exceedance sum, as the result of this integration, namely in the diagram directly beneath the integration period $t_1$ under consideration. If this excess integral value I were to attain the reference integral value IM indicated as a horizontal dashed line, which may also be referred to synonymously as the maximum sum, the protective control would identify a disturbance and, in particular, trigger the stopping of the wind turbine with an emergency blade pitching. In the example shown, however, the exceedance integral value I does not attain the reference integral value IM. A disturbance is therefore not identified, because the vibration in the example shown subsides somewhat and then, within the integration period $t_1$, no longer falls below the first lower vibration limit value $A_{u1}$ and also no longer exceeds the first upper vibration limit value $A_{o1}$, i.e., it remains in the first vibration tolerance band.

Instead of the integration shown, a summation, i.e., counting, may also be considered. Transferred to the situation in FIG. 4, the reference integral value, i.e., the maximum sum, could have, for example, the value 4. In this case, departure from the first vibration tolerance band occurred only three times, such that the value of the exceedance sum is 3, and thus a disturbance has not yet been identified.

If the vibration characteristic, i.e., the considered acceleration a, later exceeds the first upper vibration limit value $A_{o1}$ or falls below the first lower vibration limit value $A_{u1}$, an integration would then start again from zero, and thus also a new integration period $t_1$ would start. Alternatively, the exceedance integral value, or the exceedance sum, may be reduced gradually. For example, if the departure from the first tolerance band is only counted, the exceedance sum may be reduced by the value 1 per day.

Furthermore, a second upper vibration limit value $A_{o2}$ is provided. This is also indicated by a dashed horizontal line and there is also a counterpart, namely the second lower vibration limit value $A_{u2}$. Here, too, it is preferably proposed that the second lower vibration limit value $A_{u2}$ corresponds to the negative value of the second upper vibration limit value $A_{u2}$ ($A_{u2}=-A_{o2}$). These two second vibration limit values may thus form a second vibration tolerance band. They may respectively form a second generator-vibration limit value or a second tower-vibration limit value, or a second tower longitudinal-vibration limit value or a second tower transverse-vibration limit value.

In FIG. 4, for example, the second upper vibration limit value $A_{o2}$ is exceeded at the time-point $t_2$. This results immediately in the identification of a disturbance, without any integration being performed. Then, i.e., at time-point $t_2$, the wind turbine is stopped, in particular by emergency pitching of the rotor blades to the feathered position. Shortly before the second upper vibration limit value $A_{o2}$ is attained, the considered acceleration a of the vibration also initially exceeds the first upper vibration limit value $A_{u1}$, which results in a renewed starting of the integration. For reasons of simplicity, this integration is not represented here, because the second criterion is attained shortly afterwards, at time-point $t_2$, and this is to be explained here.

The switching-off of the wind turbine then also causes the vibration to subside, which is also indicated in FIG. 4.

In the same way, under-running of the second lower vibration limit value $A_{u2}$ would also result in the identification of a disturbance and in the triggering of stopping of the wind turbine, in particular by means of an emergency pitching of the rotor blades.

The invention claimed is:

1. A method comprising:
   operating a wind turbine,
   sensing at least one tower vibration of the wind turbine by a vibration sensor,
   sensing a mechanical generator vibration, caused by at least one electrical fault, by the vibration sensor, and
   controlling the operation of the wind turbine in dependence on the sensed tower vibration and the sensed generator vibration, wherein the sensor is an acceleration sensor configured to sense vibration in at least two directions.

2. The method as claimed in claim 1, wherein the sensor is arranged on a stator of a generator of the wind turbine, a stator carrier of the wind turbine, a nacelle of the wind turbine, or a tower of the wind turbine.

3. The method as claimed in claim 1, wherein sensing at least one tower vibration comprises sensing a longitudinal vibration signal and a transverse vibration signal, wherein the longitudinal vibration signal is sensed from a force acting in a longitudinal direction of a generator axis, wherein the transverse vibration signal is sensed from a force acting in a direction transverse to the longitudinal direction.

4. The method as claimed in claim 1, separating at least one vibration signal sensed by the vibration sensor into a tower-vibration signal and a generator-vibration signal, wherein the separating is in dependence on frequency.

5. The method as claimed in claim 1, wherein sensing the at least one tower vibration of the wind turbine comprises sensing a tower longitudinal vibration and a tower transverse vibration.

6. The method as claimed in claim 1, wherein the controlling of the wind turbine is functionally divided into:
   a working-point control for controlling the wind turbine at a working point, and
   a protective control, which is hierarchically of a higher order than the working-point control, for checking protective functions of the wind turbine,
   wherein the protective control checks for disturbance criteria and,
      if a predetermined disturbance criterion is identified, take over the working-point control, and
      in dependence on the predetermined disturbance criterion that is sensed, moves to a safe working point, in particular reduces or stops a rotation of the rotor of the wind turbine.

7. The method as claimed in claim 6, wherein the protective control has a main and a secondary control, wherein the main control executes the protective control, and the secondary control takes over at least a portion of the protective control if the main control fails.

8. The method as claimed in claim 1, further comprising comparing the at least one tower vibration to a tower vibration limit value, wherein a disturbance is identified in response to the at least one sensed tower vibrations exceeding the predetermined tower-vibration limit value.

9. The method as claimed in claim 1, comprising:
monitoring a vibration characteristic of at least one vibration chosen from the tower longitudinal vibration, the tower transverse vibration and the generator vibration,
comparing the vibration characteristic in each case to a first vibration tolerance band,
when the respective vibration characteristics depart from the first vibration tolerance band, summing or integrating each vibration characteristic to form an exceedance sum,
comparing the exceedance sum to a predetermined maximum sum, and
if the exceedance sum attains or exceeds the predetermined maximum sum in a predetermined first check period,
stopping the wind turbine due to a disturbance, or
outputting a first vibration warning and a stopping of the wind turbine depends on a subsequent variation of the vibration characteristic.

10. The method as claimed in claim 9, comprising obtaining the subsequent variation of the vibration characteristic, wherein obtaining the subsequent variation of the vibration characteristic comprises:
in a first subsequent step, setting the exceedance sum to zero, and
in a second subsequent step, summing or integrating each departure from the first vibration tolerance band to form the exceedance sum until a second vibration warning is output again,
repeating the first and second subsequent steps, and
counting the vibration warnings that occur during the first and second subsequent steps, and
checking whether, in a predetermined second check period that is longer than the first check period, a number of vibration warnings has attained a predetermined warning number limit, and depending on this, the wind turbine is stopped due to a disturbance or continues to be operated, and
checking whether the predetermined or a second warning number limit is attained, while the number of vibration warnings is in each case reduced by one counter following an expiration of a duration of a reduction interval, and depending on this, the wind turbine is stopped due to a disturbance or continues to be operated.

11. The method as claimed in claim 9, wherein a disturbance is identified, and wherein the wind turbine is stopped if the vibration characteristic departs once from a second vibration tolerance band, wherein the second vibration tolerance band is broader than the first tolerance band.

12. The method as claimed in claim 3, further comprising:
comparing the longitudinal vibration signal to a predetermined tower longitudinal-vibration limit value,
comparing the transverse vibration signal to a predetermined exceeds a predetermined tower transverse-vibration limit value, and
identifying a disturbance in response to at least one signal, chosen among the longitudinal vibration signal and the transverse vibration signal, exceeding the predetermined tower longitudinal-vibration limit value or the predetermined tower transverse-vibration limit value, respectively.

13. The method as claimed in claim 4, wherein separating in dependence on frequency comprises using a filter and wherein frequency components lying below a predefinable separation frequency are used as the tower-vibration signal and frequency components lying above the separation frequency are used as the generator-vibration signal.

14. A wind turbine, comprising:
a generator having a generator axis for generating electrical power from wind, wherein the generator is configured to be driven by an aerodynamic rotor having one or more rotor blades,
a nacelle, the generator coupled to the nacelle,
a tower for supporting the nacelle,
a vibration sensor for sensing a tower vibration, wherein the vibration sensor is configured to sense a mechanical generator vibration caused by at least one electrical fault, and
a controller configured to control the wind turbine in dependence on the sensed tower vibration and the sensed generator vibration, wherein the vibration sensor is an acceleration sensor configured to sense acceleration in at least two directions.

15. The wind turbine as claimed in claim 14, wherein the wind turbine is a gearless wind turbine.

16. The wind turbine as claimed in claim 14, wherein the sensor is arranged on a stator of the generator, a generator carrier that supports the generator, or a front part of the nacelle.

* * * * *